Patented June 19, 1951

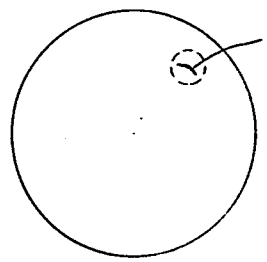
Fig 1
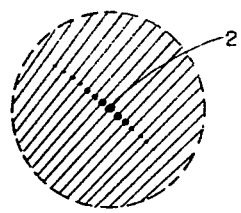
Fig 2
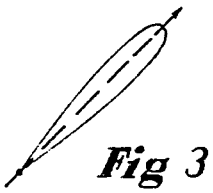
Fig 3
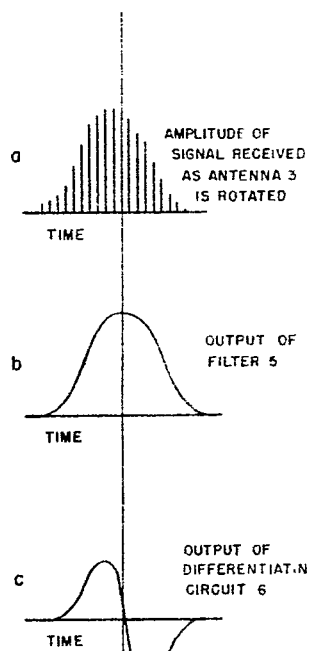
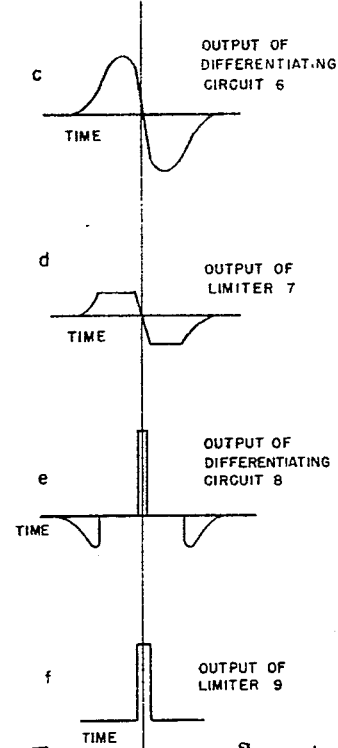
Fig 4
Fig 5

2,557,869

UNITED STATES PATENT OFFICE 2,557,869

TARGET DETECTING SYSTEM

Paul François Marie Gloess, Paris, France, assignor to Societe francaise Sadir-Carpentier, Paris, France, a corporation of France Application October 28, 1946, Serial No. 706,161
In France November 7, 1945

5 Claims. (Cl. 343—11)

This invention relates to systems for detecting obstacles, moving bodies and other targets by transmitting impulses or trains of waves of short length and of short total duration, and observing the moment of arrival at a receiver, situated close to the transmitter, of waves reflected by the target, the time taken by the waves in travelling to the target and back being a measure of the range of the target. Such systems in which radio waves are used are now generally known as radar systems.

The invention is illustrated in and explained in connection with the accompanying drawings in which:

Fig. 1 shows the appearance of the screen of a cathode ray tube indication and range indicating systems according to the invention;

Fig. 2 shows at an enlarged scale, the portion I of the screen shown in Fig. 1;

Fig. 3 indicates a directivity diagram of receiving aerial as used;

Fig. 4 shows in block diagram form one example of embodiment of the present invention; and, Fig. 5 shows curves illustrating the operation of the system of Fig. 4.

It has already been proposed in radar systems to determine not only the range of the target but also its direction by providing the receiver with a directional aerial having a polar diagram as sharp as possible. As the direction of a target is normally not known until radio echoes therefrom are picked up, it becomes necessary to rotate said aerial so that it may sweep an area at a particular frequency, preferably regularly, to search for targets. For target observation there is employed a cathode ray tube having a screen of suitable persistence and the beam in this tube is deflected radially each time an impulse is transmitted, the reflected radio echo being caused to apply a signal to the brightness control electrode of the tube so that the target is indicated by a luminous spot on the screen at a distance from the centre of the tube (the rest position of the beam) which is a measure of the range of the target. Also the straight radial line is rotated about the centre of the tube in correspondence with the varying orientation of the directional aerial so that the position of the spot indicates both the range and direction of the target. This type of target presentation is now generally known as P. P. I. presentation.

If, however, it is desired to obtain exact indication of direction, the rotary speed of the aerial must be kept low relatively to the repetition frequency of the impulses. The result is, that a target is indicated on the screen not by a single clear spot but by several juxtaposed patches, as shown at I in Figure 1 (which represents the screen of the tube), or better still as shown in Figure 2, which illustrates on an enlarged scale the area I of Figure 1. These juxtaposed patches are due to insufficient sharpness of directivity of the receiving aerial, the polar diagram of which always takes the shape of a lobe of finite width as shown in Figure 3. These patches appear to the observer as merging into an elongated patch in a direction perpendicular to the radius, so that exact measurement of the target direction becomes difficult and subject to error.

This invention seeks to overcome this defect and to provide target indication in the form of only a single central spot 2 (Figure 2) on the screen, so that measurement of direction may be made rapid, easy and reliable.

This object is achieved according to the invention by employing, at the receiver, a directional aerial having a suitable polar diagram, which provides a train of impulses the envelope of which is separated out and then differentiated twice with reference to time. The second differentiation results in a curve which, at the moment the orientation of the aerial coincides with the direction of the target, presents a very definite positive peak, which is utilised to select only the coincident pulse for target indication.

Figure 4 shows, in block diagram form, one embodiment of the invention. In Figure 4 the receiving aerial 3 feeds into a receiver 4 which detects the high frequency waves and feeds into a low pass filter 5 which separates out the envelope of the impulses and passes it to a differentiating circuit 6, followed by a limiter 7, which feeds a second differentiating circuit 8, followed in its turn by another limiter 9, which operates also as a threshold apparatus. The signal output from differentiating circuit 8, presents a very definite positive peak which is fed to the coincidence 10 which in turn selects, for the brightness control electrode of the tube 12, only that impulse, supplied through the connection 11 from the receiver 4, which coincides in time exactly with the appearance of the said positive peak, all the other impulses in the series fed directly from receiver 4 through lead 11 being rejected. In this way the desired result is obtained.

The curves of Figure 5 illustrate the operation of the system. These curves are drawn with time along the abscissa line. Curve a represents the impulses received by the moving receiving aerial 3, the amplitudes of these impulses varying in dependence on the directivity of the aerial as it swings through the target direction (see the diagram of Figure 3). These impulses emerging from the receiver 4 pass through the low pass filter 5 which passes only the low frequency components so that at the output of the filter 5 is obtained the envelope curve $b$ of the train of impulses. The circuit 6 differentiates this envelope wave and consequently produces the curve $c$ which the limiter 7 transforms into the curve $d$. The second differentiating circuit 8 supplies therefrom the curve $e$ which presents a strong positive peak at the moment when the curve $d$ passes through zero, viz. at the moment of the maximum of the train $a$, that is to say, at the moment when the orientation of the aerial 3 coincides with the target direction. This positive peak is situated between two negative pulses which are eliminated by the action of the circuit 9 acting as a limiter and threshold circuit to produce the curve $f$.

In order to secure correct operation of the polar diagram (Figure 3) the aerial should have its maximum curvature at the intersection of the axis of the aerial with the diagram—a condition which is easy to satisfy with known types of directional aerials. The different elements represented as blocks in the block diagram of Figure 4 are well known per se and need no detailed description herein. For example, the differentiating circuits may be very simply constituted by transmission circuits (for instance, a resistance-capacity circuit) with very low time constant allowing only high frequencies to pass.

It will be evident that the invention is not limited to the arrangements shown and that many modifications may be made without departing from the scope of this invention.

Having now particularly described and ascertained the nature of my said invention and in what manner the same is to be performed, I declare that what I claim is:

1. In a target detecting system the combination of a directional radio receiving device, means for varying the orientation of said device, means for selecting, from the train of reflected pulses received, the single echo pulse produced when the direction of the target corresponds with the orientation of said device, said means comprising apparatus for separating the envelope of said train of pulses, apparatus for differentiating said envelope twice in succession to produce a sharp pulse corresponding to the direction of said target and means controlled by said sharp pulse for producing a visual indication.

2. A radar system comprising a pulse transmitter, a directional receiving aerial whose orientation is varied to search for targets, a detecting receiver fed from said aerial, two differentiating circuits for differentiating twice in succession the envelope of the impulse train derived from said detecting receiver, a cathode ray tube having a control electrode, and connections for connecting said control electrode to the output of said differentiating circuits to control said cathode ray tube to give an indication of a target only when the positive voltage peak contained in the wave resulting from the second differentiation, appears.

3. A system as claimed in claim 2 further comprising a limiter connected between the two cascaded differentiating circuits and a second limiter and a threshold device connected between the second differentiating circuit and the cathode ray tube.

4. A radar system comprising a pulse transmitter, a directional receiving aerial, means for varying the orientation of said aerial in search for targets, a detecting receiver connected to said aerial, a pair of differentiating circuits connected to said receiver for differentiating twice in succession the envelope of the impulse train corresponding to the echo signals received by said aerial and impressed on said detecting receiver, a cathode ray tube, connections for connecting a control electrode of said cathode ray tube to the output of said differentiating circuits so that said cathode ray tube gives an indication of a target only when the positive peak contained in the wave resulting from the second differentiation, appears, and means connected to said cathode ray tube for controlling the indication on the screen of said tube in accordance with the plan position indicator presentation.

5. A system as defined in claim 4, further characterized in that a limiter is connected between the said pair of differentiating circuits for cutting off the peaks of the waves after the first differentiation, a second limiter connected after said pair of differentiating circuits, a coincidence circuit connected between said second limiter and said cathode ray tube, and connections for applying pulses from said receiver to said coincidence device functioning to give an indication of a target on said cathode ray tube only when a positive peak contained in the wave resulting from the second differentiation appears.

PAUL FRANÇOIS MARIE GLOESS.

REFERENCES CITED

The following references are of record in the file of this patent:

UNITED STATES PATENTS

| Number | Name | Date |
| --- | --- | --- |
| 2,364,209 | Green | Dec. 5, 1944 |
| 2,395,289 | Neufeld | Feb. 19, 1946 |
| 2,427,905 | Fyler | Sept. 23, 1947 |